United States Patent [19]

DuBrucq

[11] Patent Number: 5,111,103

[45] Date of Patent: May 5, 1992

[54] PLURAL UNIT MONITOR

[76] Inventor: Denyse DuBrucq, 812 Noridge Trail, Port Washington, Wis. 53074

[21] Appl. No.: 459,140

[22] Filed: Dec. 29, 1989

[51] Int. Cl.$^5$ .............................................. H01J 1/00
[52] U.S. Cl. ........................................ 313/2.1; 313/3
[58] Field of Search ........................ 313/1, 2.1, 477, 3; 340/712

[56] References Cited

U.S. PATENT DOCUMENTS

| | | | |
|---|---|---|---|
| Re. 33,151 | 1/1990 | Adler | 340/712 |
| 3,071,706 | 1/1963 | Waldorf | 313/2.1 X |
| 4,712,038 | 12/1988 | Takenaka et al. | 313/2.1 |
| 4,777,407 | 10/1988 | Takenaka et al. | 313/2.1 X |
| 4,792,720 | 12/1988 | Takenaka et al. | 313/477 R |

Primary Examiner—James J. Groody
Assistant Examiner—Mark R. Powell
Attorney, Agent, or Firm—Varnum, Riddering, Schmidt & Howlett

[57] ABSTRACT

A mosaic of monitor units contained in a single covering provide higher-resolution monitor displays proportional to the number of monitor units contained in the monitor casement. The extension of the flat viewing surface of the monitor in one or more directions accommodates the touch screen function both over the monitor surface and in the area surrounding it with one transparent layer between both the electronic image and marginal fixed markings and the touch response surface reduces parallax factors. A receiver and signal processor which outputs dual signals, the first defining the image in a Standard Broadcast mode and the second providing selected sharpness where detail is required. The method for action video of transmitting only the changes in the high-resolution areas cuts data transmission and recorded date levels. Audio unit configuration accommodations directionally both listening and speaking reducing sound contamination in the environment and allowing response in the direction of the sound source. These developed can improve both video and computer presentations, and in the visual display combine video, computer and computer graphics imaging. Special engineering design reduces the electrical power requirements. For even higher-resolution displays, more optical fibers in the image plates of the cameras and a multiplicity of processors, recording bands and RAM Memory unites to accommodate the increase in resolution are provided. Cameras accommodated include video cameras and scanning cameras as for air surveillance and tissue probes.

7 Claims, 10 Drawing Sheets

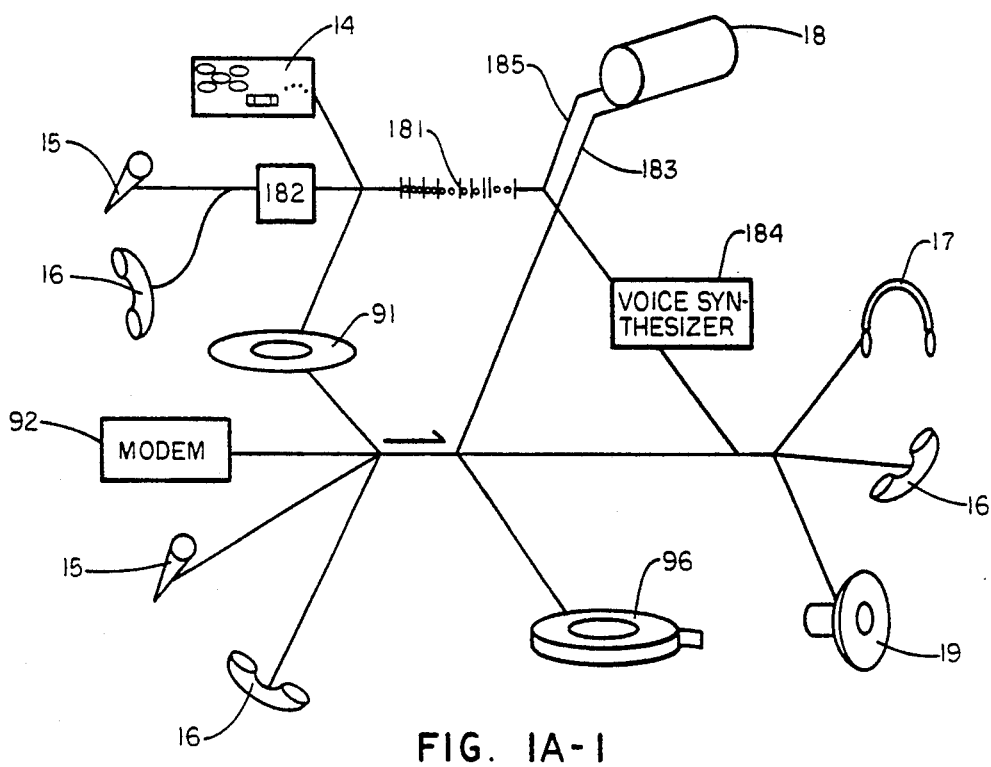
FIG. IA-1
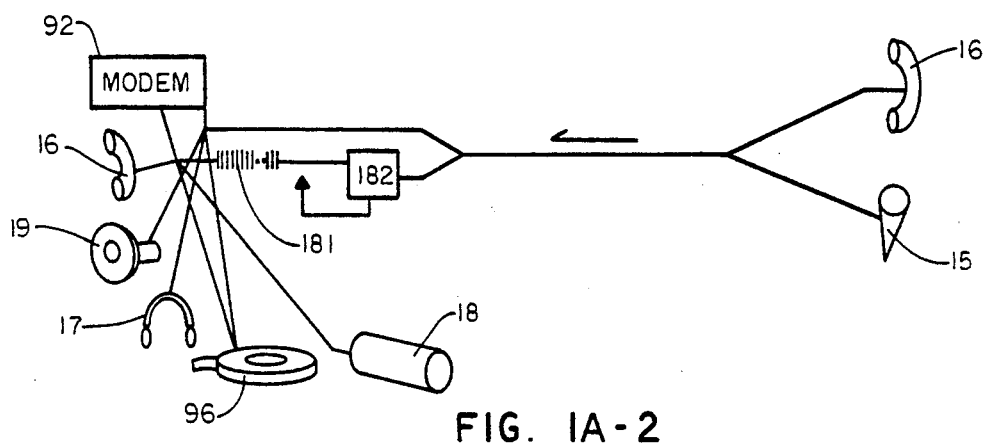
FIG. IA-2
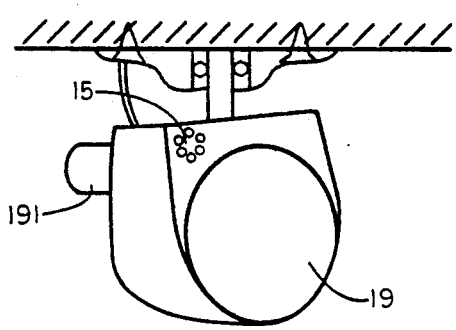
FIG. IB
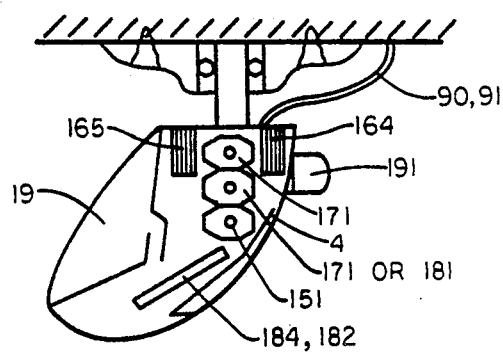
FIG. IC

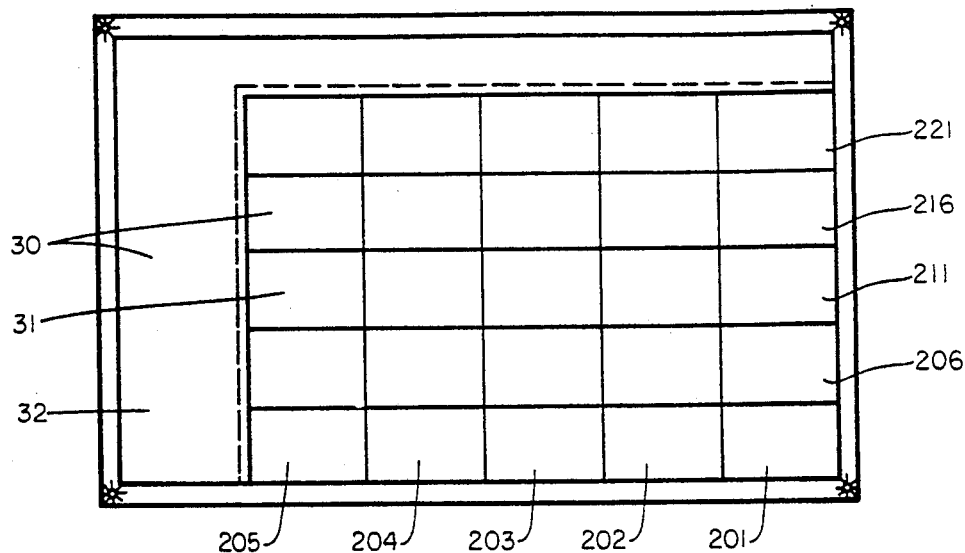
FIG. 3A
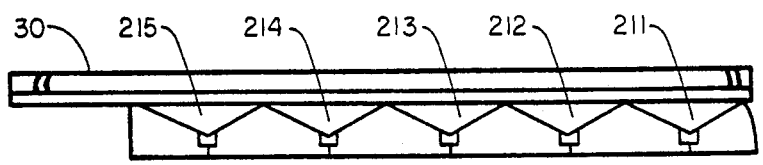
FIG. 3B
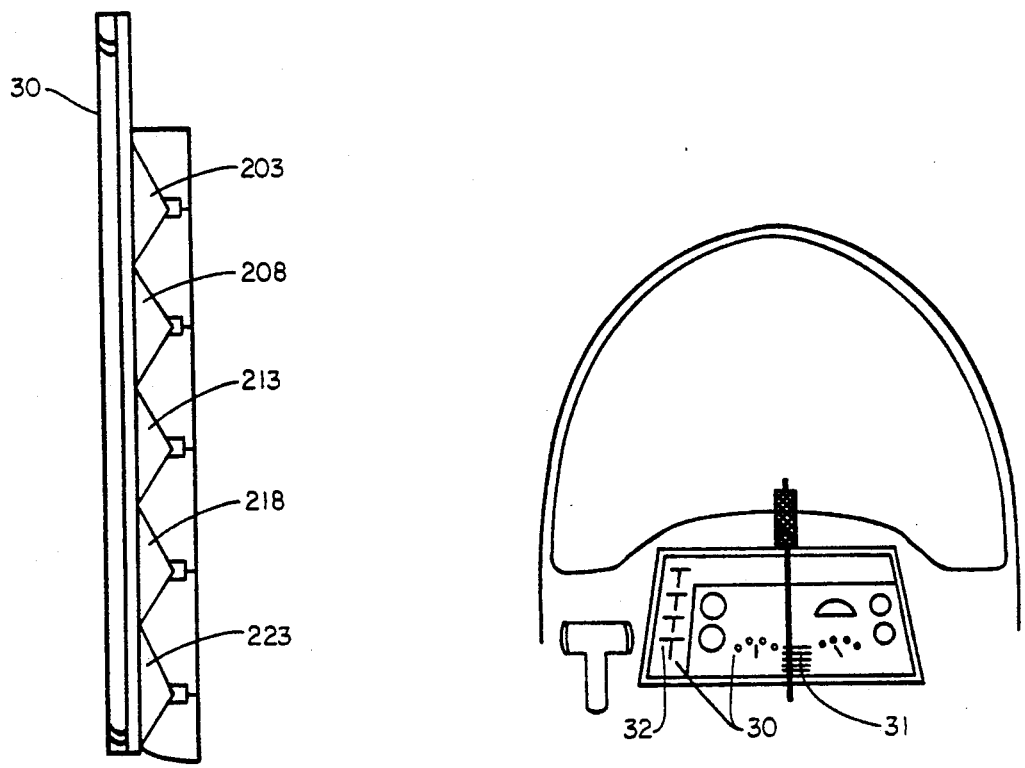
FIG. 3C
FIG. 3D

PLURAL UNIT MONITOR

This application is a continuation-in-part of International Application PCT/US88/01631 having an international filing date of May 17, 1988.

BACKGROUND OF THE INVENTION

1. Field of the Invention

This invention relates to television and more particularly to an apparatus and method of obtaining high resolution of a dual video signal in a mosaic of receiving monitors, while simultaneously maintaining a high quality audio signal.

2. Scope of the Prior Art

Definition of video imaging in common use in the United States makes detail discrimination impossible because the number of light units, called pixels, making up the image are insufficient in number to create, for example, readable print at print media size lettering. When a touch-sensitive screen is used for response to computers, two or more layers of clear substance between the image and the viewer visually displaces the image due to refraction and parallax or otherwise interferes with the image because of stray reflections. Also, the normal speaker placement on video sets makes the sound spill far beyond its intended listener. The combined discoveries described herein enable, through use of current video capabilities, reconfiguring the display to contain a multiple of presenting units each at the state-of-the-art resolution to comprise the image; to enable a touch-sensitive substrate to be on the same planar layer of clear substance as the image is cast reducing refraction; and to house the speaker unit with microphone to target the listener with the transmitted sound and to allow the listener/viewer to speak back to the sound source in response. Also, means of reducing the transmission load for higher definition television is obtained by a selected sharpness technique which gives image retention between frames by continuously transmitting only pixel units that change.

SUMMARY OF THE INVENTION

In accordance with the invention, an apparatus for displaying a video image is provided which comprises an enclosure having an image screen and a coplanar transparent faceplate. A plurality of monitor units are disposed within the enclosure, immediately adjacent to each other in a planar array. The array is disposed adjacent the image screen. Means are provided for generating an image on the image screen from each monitor unit in response to a first signal where each image touches but does not overlay an adjoining image. The entire enclosure defines a space at substantial vacuum.

Preferably, the monitor units are formed from hollows within an integral permeable substrate which substantially fills the enclosure, and provides a resistance to the negative pressure on the enclosure caused by the vacuum. Preferably, the image screen has discrete phosphors, with the first signal being a scanning electron beam, and the phosphors being selectively responsive to the electron beam.

In another aspect of the invention, a second external screen overlays the image screen and which generates a second signal in response to touch at discrete points on the second screen. The second screen is preferably grounded to dissipate static charge and decrease interference with the image on the image screen. Preferably, the substrate and all screens are formed of nonmagnetic substances.

In yet another aspect of the invention, the means for generating an image includes means for applying a low voltage across a portion of the surface of the transparent layer adjacent the image screen. Preferably, the means for applying a voltage comprises a first layer of strips of conductive material on the surface of the transparent layer, a second layer of strips of conductive material overlaying the first layer and offset therefrom, with each strip of the first and second layers being insulated from an adjacent strip. Also, each strip of the second layer is conductively connected to and adjacent the strip of the first layer. When the signal scans the strips in a raster, a voltage is applied to each strip consecutively as the raster proceeds so as to conserve power.

In a further aspect of the invention, the first signal comprises a standard broadcast signal and also a high-resolution signal. Means are further provided to calibrate the location of each image on the image screen. Also, the apparatus may comprise an image sorter to selectively cast a discrete image on a single monitor unit.

In yet another aspect of the invention, the apparatus comprises an audio unit disposed so that sound is directed to permit lower volume to be used and reduce environmental noise by limiting the sound field. Also, a directional microphone can be disposed to receive voice responses, directly, with reduced ambient sound interference and to permit a person to orally respond in direction of the sound source. Preferably, the audio unit and microphone are incorporated in an array of head and handsets for both listening and transmitting voice messages. Also, preferably, the entire enclosure is pivotably mounted to a base to permit adjustment to accommodate user posture with direct sound from the speaker and the proper microphone angle.

A further aspect of the invention provides a method for processing a high-resolution signal in motion video composed of sequential frames of pixels comprising the steps of providing a video signal comprising individual pixels; reducing the video signal in each pixel to individual pixellettes comprising three primary colors; determining the intensity of each primary color within each pixellette; polling the intensity determination to evaluate changes in intensity of each color in the pixellette from frame to frame; generating a first signal for each pixel which has no change in color intensity from frame to frame; simultaneously generating a second signal for each pixellette which has a change in color intensity from frame to frame; and transmitting the signals to a receiver which combines the first and second signals to generate an image on a plurality of monitors configured in a planar array, each monitor receiving a portion of the signal so generated. Preferably, the second signal is updated from frame to frame only where change in coloration occur so that the amount of data transmitted can be reduced.

BRIEF DESCRIPTION OF THE DRAWINGS

FIGS. 1a to 1f are diagrams of various means for providing the range of audio treatment enabled in the audio/visual display, according to the invention;

FIGS. 3a to 3d are diagrams of the mosaic monitor of FIG. 2 incorporating a touch-sensitive screen with a suggested application;

DESCRIPTION OF THE PREFERRED EMBODIMENTS

Figure 1D:
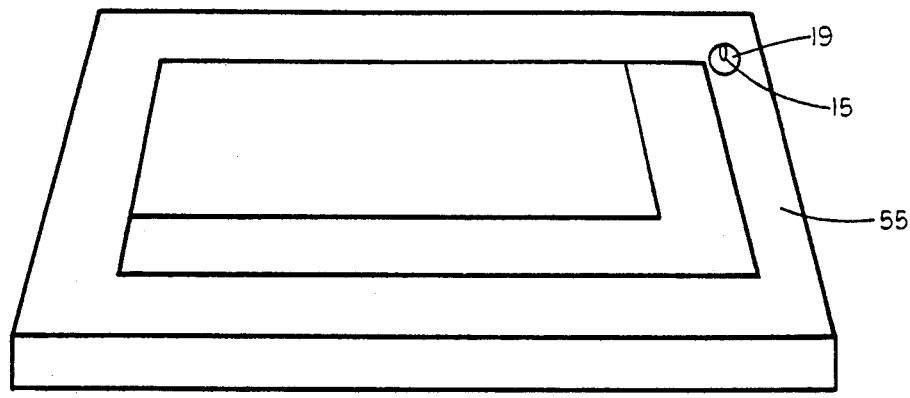
Figure 1E:
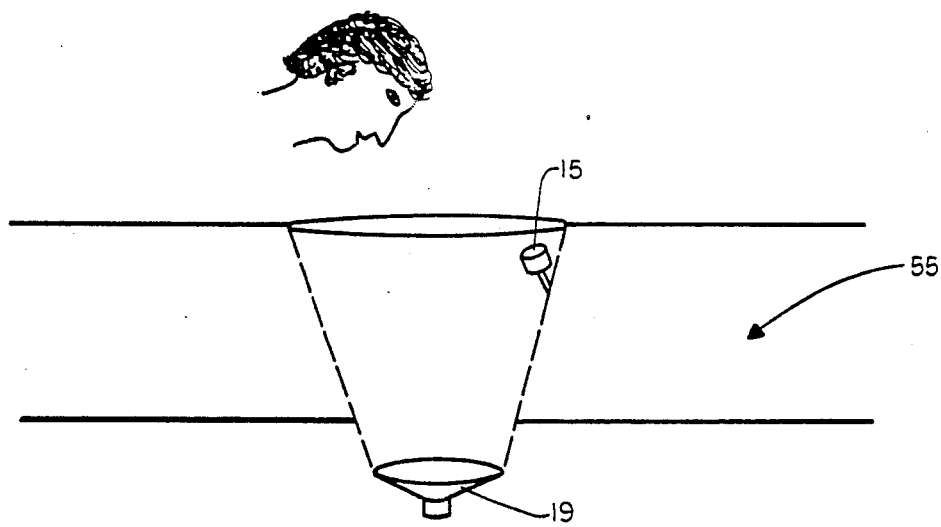
Figure 1F:
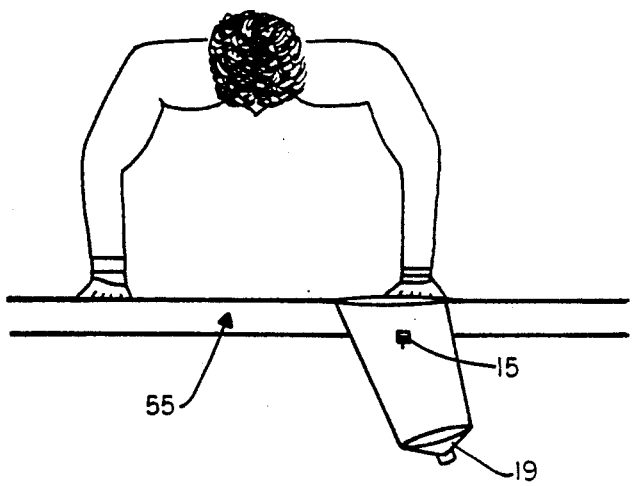
Figure 2A:
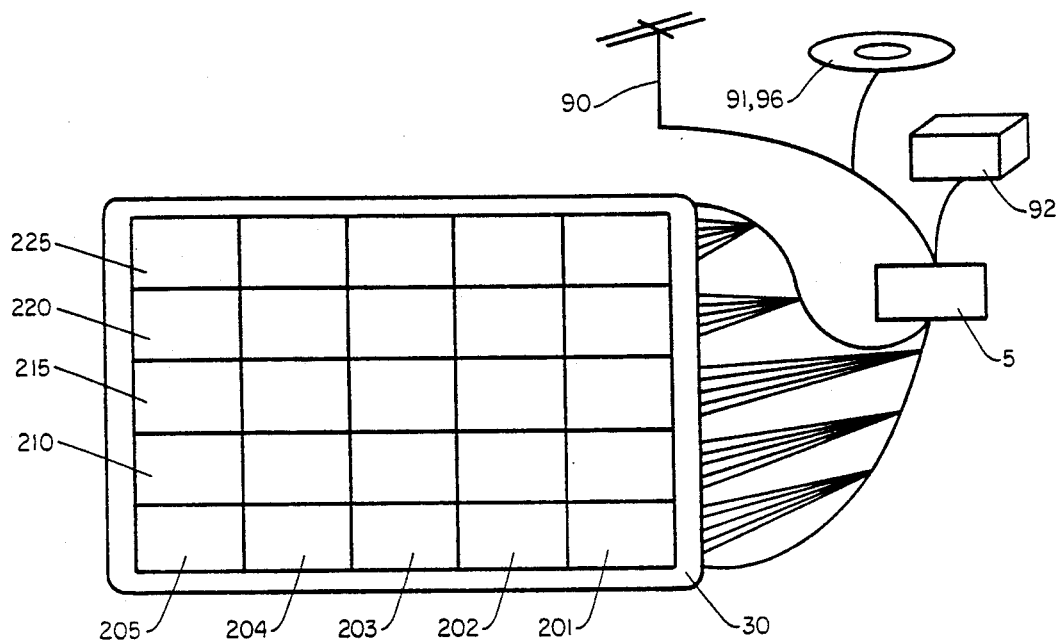
FIGS. 2a to 2d are diagrams illustrating a mosaic monitor according to the invention with alternative means of presenting very much higher-resolution video, computer and computer graphic displays.
Figure 2B:
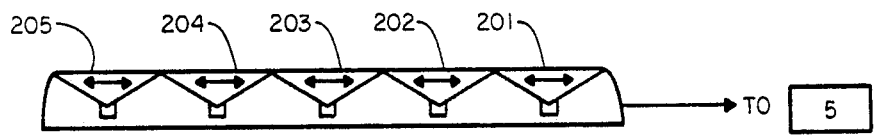

FIG. 1 illustrates audio interfacing according to the invention with the Information Station as disclosed in co-pending International Application PCT/US88/01631 having an international filing date of May 17, 1988. Generally, FIG. 2 illustrates a means of providing a higher-resolution monitor through a plurality of fractional monitor images created by an electronic division of the video or computer signal into a number of signals proportional to the number of fractional monitor images employed in producing the total higher-resolution image. FIG. 3 more particularly shows a means of including both a monitor casing and an extended area of surface for a touch-sensitive screen having only a minimal thickness of clear material to reduce refraction and parallax of transmitted light of the image. FIGS. 4-8 illustrate an embodiment of means to develop the image with standard signal output plus the enhancing band, and to process the signal into the display image. Also shown is an autoalignment and autotuning mechanism and a preferred mechanical and electronic structure. Finally, FIG. 9 illustrates a second generation system for extremely high resolution imaging and display.

A means of presenting higher-resolution imaging electronically according to the invention is provided by using a multiplicity of monitor units in one glass or transparent-material housing which displays sections of the total image. This concept is illustrated in FIG. 2A which shows one such housing with 25 monitor units, each side having, five video segments. This can, in theory, multiply the resolution twenty-five times (25X) that possible with a single monitor of equal resolution power.

Figures 2C, 2D:
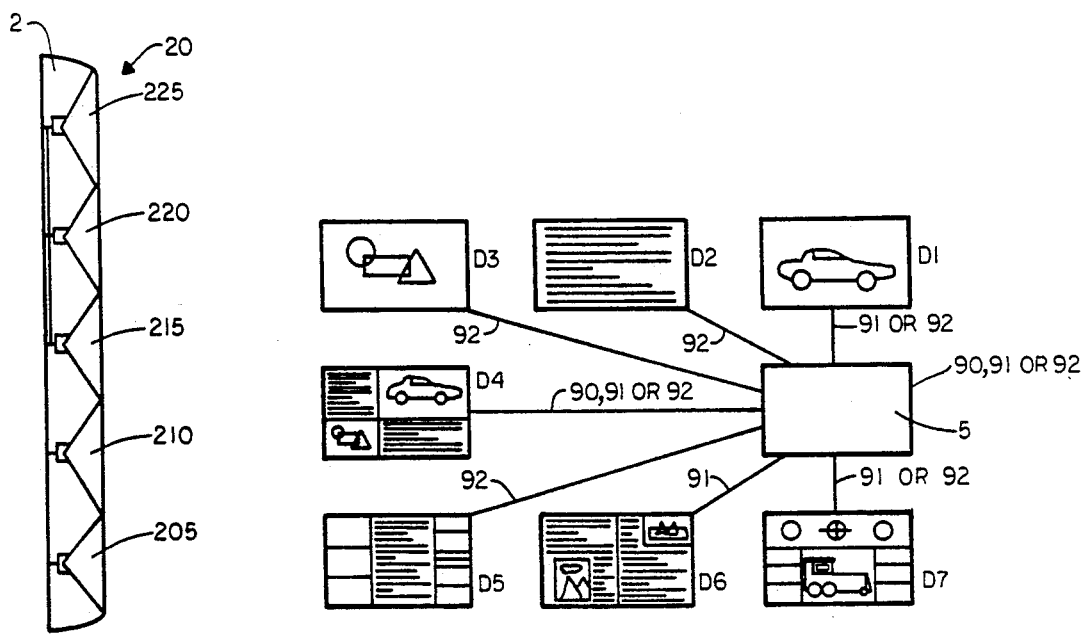

With current image recording far outpacing the commercially available 525 line video recording, employing an image-dividing circuit 5 to allocate the image sections appropriately to each of the included monitor units, a much higher-resolution recording means can be employed. Under the present standard, for example, the image is created on five scan lines and repeated on five horizontal pixels. However, recording with high-resolution cameras on either high-resolution tape, videodisc, analog signal, or compact disc, and in digital signal formats accommodates electronically the full advantage of expanded resolution. Examples of some of the presentations possible in segmenting the screen are shown in FIG. 2D where 25 separate images can be presented as well as the composite ones with multiple monitor units for video, computer and computer graphics displays with both stills and motion pictures. These are shown in drawings D1, D2 and D3. Drawing D4 combines the three with the computer image divided. Drawing D5 gives segments for inclusion in desk-top editing. Drawing D6 gives a completed two-page spread with photos graphics and text. Drawing D7 suggests an aviation application with the approach plate map showing on the central 3×3 section in the lower three monitor unit rows. The remaining monitor images provide electronic imaging of the aircraft instrumentation with several gauges in the lower units presented on a single monitor and several monitors used in composite for presenting the navigation instrument composites. Also, a window digital readout can provide time, altitude, airspeed, direction by degree, VOR radial and the like. Image sources are broadcast video 90, recorded video 91 and computer 92.

Looking at the composite monitor itself as presented in different views in FIGS. 2A, B and C, each monitor unit is identical and disposed such that the phosphor regions illuminated by their scans meet but do not overlap both horizontally and vertically. The vertical sequence requires that the scan of the last line of the upper monitor light the phosphor units adjacent to those illumined by the top scan of the lower monitor unit and so forth. The adjacent units horizontally begin scan rows adjacent to the end of the neighboring units. Using a tubule-type mask with tubules angled to let pass only the specific scan moment, no crossover of images can occur between neighboring units.

Figure 7:
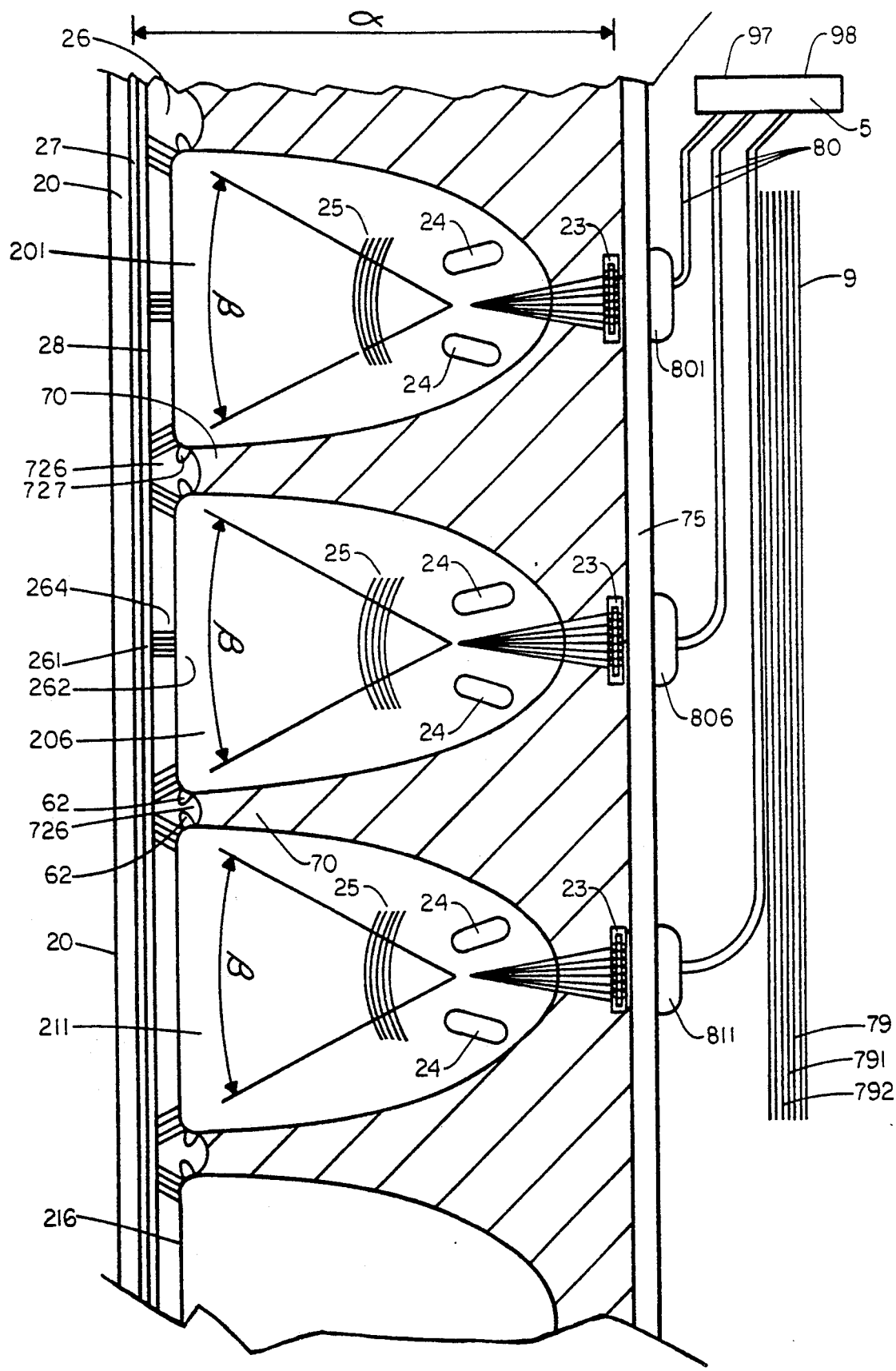
FIG. 7 is a sectional view of a portion of the mosaic monitor according to the invention.

One manner of construction of a mosaic monitor according to the invention is illustrated in FIG. 7. A molybdenum shield 26 serves as a mask for passing selected moments of an electron beam from the 15 emitters. In the embodiment disclosed herein, the molybdenum shield 26 is conductive. It will be understood, however, that the shield may be formed of any non conductive material such as a ceramic. There are three emitters, one for each color, red 234, green 235, and blue 236 for each scan line and five lines are scanned simultaneously. Thus, each monitor unit has 15 emitters from an electron gun 23. The shield 26 has five horizontal lines of vertically aligned apertures or tubules to correspond to the five scans of each electron gun 23 in each monitor unit. Each tubule is associated with three color-specific phosphors, red 864, green 865, and blue 866 on a phosphor screen 27 disposed adjacent the shield 26. Proper alignment and balance adjusts the three colors of each electron gun 23. The beam generated by each gun is focused by the lens 24, and the raster scanning coils 25 displace the beam accurately to create the scan.

Each tubule extends through the shield 26 to direct a moment of the electron beam to three of the phosphors which define a pixellette. Analog scans are the preferable means of input since the preferred processor 5, converts digital and composite images to the analog mode providing a multisyncronous image appropriate for merging a computer and a video signal.

The final lens 20 and raster scan coils 25 are placed on an insulating substrate within a vacuum sealed enclosure housing the monitor unit group along with as much electronic inclusions as needed. Either a multiwire output and power input will come from the enclosure or each monitor unit will have wiring emerging from the enclosure. This depends on engineering preferences.

The drawings illustrate at least a 90-degree scan angle, though angles to 110 degrees are acceptable for end monitor unit. No screen size limitation is provided since its size depends on the application. For a 14-inch diameter screen, however, one could anticipate a possible screen depth of less than four inches with the theoretical twenty-five times increase in resolution. Present state-of-the-art monitor designs can be employed in miniature, with the art to be required in casement construction.

It will be readily apparent that the tubules must be aligned in registry with the electron beam as it scans from one edge of a monitor unit to the other. In other words, the longitudinal axis of each tubule at the edges of each monitor unit will not be perpendicular to the planar surfaces of the shield 26.

As shown in FIG. 7, alignment may be achieved through cutting the tubules with a five-laser drill vertical packet at the focal point of the electron guns. The distance $\alpha$ between the phosphor screen 27 and the gun 23 is crucial to image integrity.

The substrate in the interior of the enclosure has hollows to define each monitor unit. A stem-like structure 70 provides structural integrity against the internal vacuum of the enclosure. The angle of scan $\beta$ determines the size of each stem-like structure 70 and thus the requisite span strength of the glass 20 and molybdenum 26 display face. The stronger the structure, the larger the span that can be applied in this method. The vacuum required, $10^{-6}$ mm Hg, to permit satisfactory use of the electron guns gives considerable inward pull on the surface span.

Interfacing the adjoining monitor units is accomplished with the placement of the tubules at the edge of each monitor unit display. Referring again to FIG. 2D, display patterns in adjacent monitor units keep cadence with the phosphor units 86 so no break in pattern exists on the outer surface 261 of the molybdenum shield 26 and what is observed on the screen 20. This provides the difference between a conventional video wall and this seamless, one-vacuum display.

The construction of the monitor configuration shown in FIG. 3 is the same as described above for that monitor design shown in FIG. 2. The only major difference is that the front section outer shape varies as shown in the three FIGS. 3A, B and C. A special extension 30 carries beyond the planar outer surface in one or more directions. This structure permits touch screen surfacing to allow keyboarding external of the display as described in co-pending U.S. application Ser. No. 085,958 filed May 18, 1987, now abandoned.

A mosaic monitor according to the invention with a touch-sensitive screen is illustrated in FIG. 3. The external touch screen technology applied externally of the monitor is conventional, reference being made, for example, to touch screens manufactured and sold by Microtouch Systems, Inc. In accordance with the invention, however, the touch screen substrate is placed on the monitor glass directly to reduce the number of interfaces through which the image must pass. Thus, reflection of the image can be minimized. Also, with reduced depth of inner to outer surface, i.e., that of the image-producing phosphor and that of the touch-sensitive surface, the refraction and parallax of the image in making the touch input is reduced.

Figures 4A, 4B, 4C:
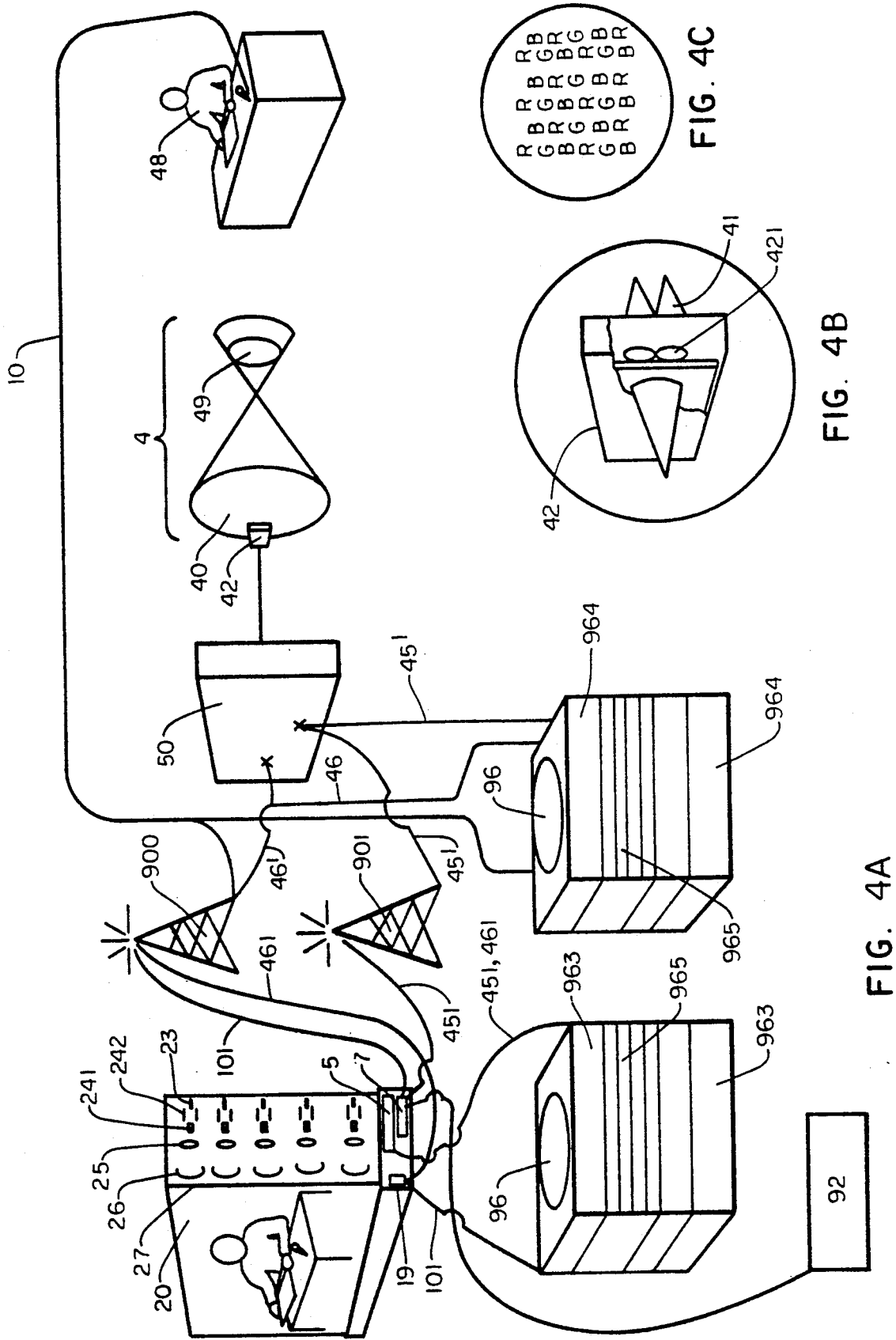
FIGS. 4a-4c are diagrams illustrating a means to preserve the pixel unit for a standard broadcast signal and simultaneously enhance the image resolution on a second signal.

To enable image processing and reception with the high definition achievable with the multiple unit displays and still work within the framework of the NTSC or PAL Standards of the U.S. and Europe, respectively, the image is recorded in two ways. A first signal provides resolution in accordance with NTSC or PAL Standard providing defined analog lines as it would be transmitted on broadcast bands. A second signal, useful for a high-resolution display only, provides for the expansion in resolution needed in the particular pixel where differences in coloration or brightness occur, with a number of defined analog lines proportional to the resolution multiple. FIG. 4 illustrates the dual signal creation with camera design using, for example, a 5×5 unit mosaic display. Twenty-five (25) fibers in a square bundle create a number of pixellettes with intricate detail within a pixel. Each pixellette is represented by a fiber in the bundle. The receiver unit for the bundle has 75 information sources, three colors for each of the 25 pixellettes. If all reds have the same intensity, all greens have the same intensity, and all blues have the same intensity, the signal from the receiver unit sends the resultant color out on the NTSC or PAL Standard band frequency only. If they differ, then the majority color is transmitted for that pixel on the Standard band frequency and the defined pixellettes are transmitted on the high-resolution frequency band. In this manner, the high-resolution band is created without unnecessary wiring during the imaging process.

A sample pixel might look like this:

| r | | R | r | r | | R | |
| | g | | G | g | g | | G |
| b | | B | b | b | | B | |
| | | R | R | r | | R | r |
| G | G | | G | | G | | |
| | B | | B | b | | B | b |
| R | r | | r | | R | r | |
| | G | | g | g | | G | | g |
| B | b | | b | | B | b | |
| | R | r | r | r | | r | |
| G | g | | g | g | | g | |
| | B | b | b | b | | b | |
| r | r | | r | r | | r | |
| | g | g | g | g | | g | |
| b | b | | b | b | | b | |

The lower case, normal text rgb triads representing the majority color phosphors, and the modified RGB, rgb, and RGB triads representing three additional colored pixellettes within the pixel. The pixel image receiver 42 determines if the full 25 pixellettes are of the same color. If so, it is in the NTSC track. If not, it is processed in two ways. First, the colors in the pixel are noted and number of pixellettes determined for each to determine the majority color for transmission. This does three things:

1. It determines the specific colors which can be numbered;
2. It marks the pixel with detail to insert in NTSC signal and to provide analog cadence for insertion of second signal detail; and
3. It prepares the data for second signal transmission described as follows:

As we see in the colors rgb, RGB, rgb, and RGB, each color can be represented with a single digit number 1, 2, 3, 4, respectively, for the picture region. Then as the signal sweeps five deep across the pixel data, the colors can be given by single numbers Here is this pixel transmitted on band two:

| 1 | 2 | 3 | 1 | 2 |
| 2 | 2 | 3 | 2 | 3 |
| 2 | 3 | 3 | 4 | 3 |
| 4 | 1 | 1 | 1 | 1 |
| 1 | 1 | 1 | 1 | 1 | and the following pixels are so coded as well. The majority color is '1' with 11 pixellettes; '2' has 6; '3' has 6; and '4' has 2. Again this cuts signal size. Region palettes can have color libraries as this to cover the next image unit. During NTSC imaging, the color codes can be transmitted on the high density band. This seems digital in nature, but if done on a sound spectrum basis, it would carry as analog. With the first '2', the color blend can be available and cover for all subsequent '2's. '1' is defined in majority color transmission on NTSC. Here the first row has two color definitions, '2', and '4'. In row two '3' is defined and the rest of the pixel is complete. If the next pixel contains these colors, no further definition is needed. If '2' becomes the majority color, '1' and '2' reverse, but '3' and '4' are in place. With '2' defined, the transition is complete.

The two signals are broadcast or recorded synchronously with the high definition signal filling in cadence from the majority color pattern. Immediately the definition is provided as the frame image forms which is swept by the electron gun control output and the changes for the next image are in place in time for the next scan in the RAM Memory 5.

For any reduction in image size, the pixellette selection is made by processor 7 selecting the specific colors by number. To achieve even higher than the standard high resolution of 2625 lines for a 5×5 display unit with 3500 points across, the most efficient means is to mosaic the mosaic system. In other words, incorporate into a single 10×10 display vacuum system, for example, four 5×5 display units. The signal provided is the same as the previously described two band signal comprising the NTSC standard and the high definition signals for each display unit component. Thus, for the 10×10 display, eight bands of recorded signal are required to define the image.

For medical, military, and industrial applications, the camera similarly comprises four sets of optical fibers associated with the retina or image plate in the same configuration as is the display units. It will be readily apparent that the display units can be configured in a manner specifically tailored to a particular application. For example, a medical image may require a long, narrow display. Thus, the individual monitors may be configured in a single row of four with 2625 lines down, and 14000 points across. The camera for such a system would require fibers feeding the signal in like manner. For NTSC or PAL standard signal, a portion of the signal providing a square pattern is used, and processed with the dual signal hereinabove described. Combining the dual signals as also described provides the image with extremely high resolution.

For motion video, the high-resolution selective sharpness permits the image to be retained between frames whereby if the image hasn't changed between sequential frames, no new data is recorded and defined image remains. Thus, in motion sequences, only the high-resolution detail that changes frame to frame is included in the input for that frame on the high-resolution frequency band. This way, the data load is less. Full screen definition is needed with new scene events, but for the sequence that follows, the data is minimized. The image receiver unit then compiles data for the frame displays drawing from first the NTSC- or PAL-type signal, then overpainting with last frames high-resolution input and last adjusting this high resolution for the detail provided in the current transmission.

Were one to use a display of eight-by-eight monitor units, giving a resolution equal to the granulation of film emulsion on commonly used X-ray film in a 14"×17" display, for example, all areas where there are coloration or brightness changes are given this selective focus. These areas are determined by the processor according to line number and the inverse of line resolution times the proportion along the scan to locate it on the analog scan. Assume, for example, an X-ray image of a bone. With a 525 line display, 700 is the resolution factor for a square pixel display. The bone image, for example, might begin 3/7 across the screen image. Therefore, the selected sharpness begins on that scan line starting at 300/700 and extending to the last 700th which has multiple contrast factors The scan here, rather than painting eight identical lines over the bone area paints the eight lines with the appropriate intensity and coloration to give the definition of the image equal to the film now used. The advantage here is that the data required to store an image is greatly reduced. Now hospital pathology labs, for example, have computer systems overloaded with data used in imaging microscopic, X-ray and CAT and NMR Scan material. This selection of image components to be expanded in definition will cut this amount of data greatly in many instances.

Figure 5:
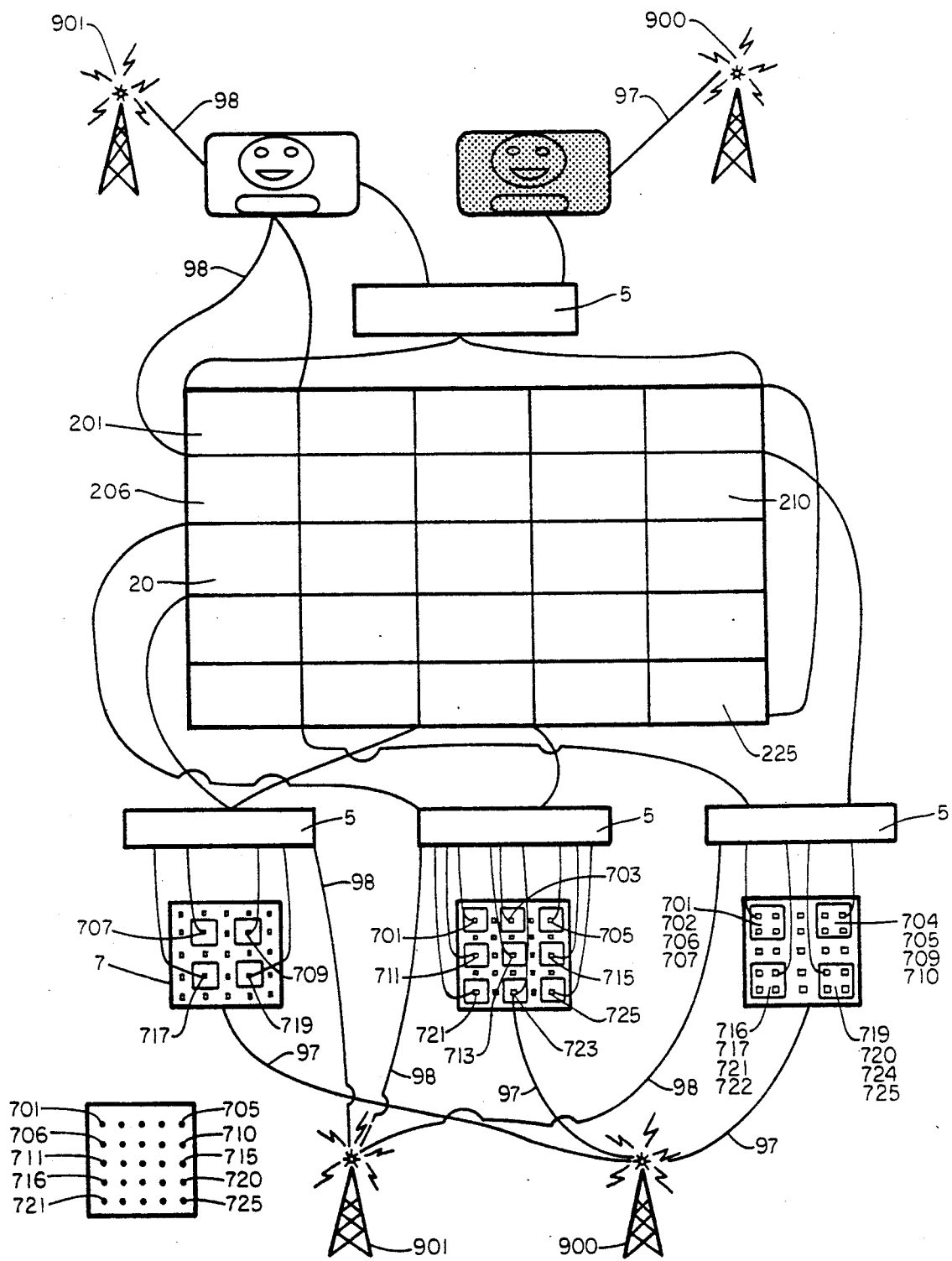
FIG. 5 is a diagram of selected pixel components for different levels of image expansion used in multiple image displays when segmenting the screen.

FIG. 5 illustrates how the image processor works with multiple monitor displays by selecting th portion of the picture in the first image that each screen will display. It then figures the number of lines used for each transmitted line and the display processes it. For high definition, specific pixellettes are used per pixel in presenting the image. Television can be watched in the current standards at any display. Depending on viewer's choice, the image may be on one monitor or, for example, four, nine, twenty-five, or thirty-six. Each input is processed according to the selected area it covers. Taking the second transmission, the image is sharpened by a factor of the resolution increase which is defined by the number of identical lines in displaying the standard signal. Each line will have regions of definition in most displays. However, for each pixel left at NTSC or PAL resolution, most of the data normally transmitted is found unnecessary.

Using this transmission band pair, most high-definition screens can be served with signals by taking pixellette patterns proportional to color units or pixels. In the case of the Mitsubishi Diamond Scan Super VGA color analogue monitor providing up to 1280×1024 resolution, for instance, the RAM Image Processor can use a modified 2×2 monitor display configuration with three of every 35 units giving only one point input to reduce the 1400 points to 1280, and lines using one line only in 26 of the lines reducing the image from 1050 lines to the 1024 without distorting the image.

The high-resolution camera determines the content of the second signal. In reception, all lines (525 times the square root of the number of monitors, i.e., the resolution factor for NTSC work) are defined. If the pixel number in the resolution conglomerate for single line NTSC definition shows no difference in color or brightness among them, then that data is recorded only on the standard signal and no further resolution is necessary. However, anywhere along that scan where differences occur, the line number and proportion of analog scan is provided and the line-by-line detail is transmitted for that scan segment in the high-definition signal. This compare and contrast means occurs for each scan and the breakout in resolution is occurring only where required. In the image processing for motion video, the memory unit compares the last image with the current image and reports for transmission only changes in the high-resolution areas.

The mechanism for displaying received signals includes an electron gun packet consisting, for the five-by-five unit display, of a vertically aligned set of five tricolor emitters producing 15 electron beams. The 15 electron beams pass through a dual-unit lens 24 condensing the vertical 241 and the horizontal 242 dimensions, as depicted in FIG. 4. The raster 25 directs the electron beam to illuminate the screen through five vertically aligned tubules at once, each tubule receiving electron beams from one of the five tricolor emitters. This requires 105 scans to cover 125 horizontal rows, each row comprising 700 tubules across. For the standard NTSC signal, a square area covered by five adjacent rows and five adjacent columns has the same color and brightness throughout, and hence only 140 variations occur on the horizontal. With the high-resolution band, color and intensity may vary from pixellette to pixellette, and hence 700 variations can occur across the scan for each of the five tricolor emitters, defining each tubule with the three colors. The image is electronically copied from the RAM palette 5 which varies the intensity of each of the 15 electron guns 23 as the 105 scan passes are made 60 times per second (or 59.4 times per second not to beat with 60-cycle current in the United States to reduce the display flicker).

Recording of these dual signals is preferably done on flexible discs of mylar base, currently used in the U.S. The autocharger technology disclosed said co-pending U.S. application Ser. No. 085,958, filed May 18, 1987 can be applied to the recording from the camera image and a thin pack of 100 discs in a four-inch high changer can provide efficiency in the recording as well as in the editing of image sequences.

The breakout scan provided on the second transmission or recording for each image may be useful in analyzing data to detect motion, strains, and the like. For example, in looking for troop movement from reconnaissance recordings, images of sequential frames can be compared by change in the extent of definition breakout while the rest of the detail is eliminated by subtracting one image from the other just leaving the color of movement in the direction of motion and away from it by aligning the images and finding and displaying and recording the differences. Overlaying this detail on either image gives the location of movement.

To save data capacity on transmission of motion sequences, the RAM memory Palette 50 in the camera which collects the image can cancel any signal that was identical in the previous image and transmit only the changes in the enhanced resolution signal output. This reduces the overall data volume.

The processing here is kept analog using time as the measure for location of resolution definition. The following discourse shows the resolution definition requirements for defining the letter "A". The background paper is white and the resolution of its color is sufficient in NTSC Standard definition. The center section of each line of the letter is sufficiently defined as well in NTSC. The resolution expansion occurs where the white and black intersect within the same pixel, each line by one seven hundredth of the scan. Where some of the full resolution have black and others white, or where the detail in the one seventh hundredth of the line changes color or intensity within that space, then this marked pixel is defined for the full number of lines possible and by the portions of the one seven hundredth of that line equal to the number of lines per line. The processor for the display picks up these expansion points and feeds each separate monitor unit in the display with the lines and portions of field crossing where the expansion is provided. The whole perimeter of the "A" and the hole have defined pixels around them unless, for the crossbar, the line separation is along the division between lines of pixels, on the top and the bottom of the crossbar.

The video camera 4 is made for recording the images in the specific display configuration, whether 5×5, or 8×8, or 5×7 units. For each hole in the tubule design mask 26 in the display, the camera has one optical fiber placed in the retina or receptor plate 40 of the camera 4. On this surface the object 48 is focused by the camera lens 49. The fibers are in pixel blocks 42 and for efficiency are combined in 140 pixel block units for the 5×5 display camera. Each display unit has 105 of these blocks placed one on top of the next to give the full resolution for that unit. Then 25 of these units are combined to make a 5×5 matrix for the entire retina structure. These fibers go to the optical diode area of the image processors which takes intensity levels of the three colors, red, green, and blue, and compares them to determine whether the pixel need be defined. This output is highly defined imaging for the standard broadcast signal. And for those with mosaic monitors it matches film resolution.

The image provided by the camera having such signal processing capabilities can also find application in the printing field for preparing plates for three color processing. This is accomplished by mathematically converting the image color balance from the primary trio of red, green, and blue to red, yellow and blue, respectively. Simultaneously decreasing the red level, increasing the blue level, and substituting the yellow for green, will produce tricolor separations as well as direct color applications from signal scans.

Another embodiment of a camera and display incorporating the concepts of the invention is illustrated in FIG. 9. The camera is schematically shown mounted on an aircraft 39. The camera has a cylindrical rod lens 49 illuminating a single line of pixellette fibers 40. Each group of five fibers directs light to one of a plurality of triphotodiodes 501 through 505. Each of the triphotodiodes 501 through 505 retains five sequential signals for producing a complete pixel which is then processed as previously described into the dual signal system. The single line of pixellette fibers represents the number of pixellettes in a single sweep of the scan across the image. Sequential frames produce a continuous video image over time.

The receiver for these synchronized signals comprises a plurality of mosaic monitors built into a continuous display. Each row or column of mosaic monitors in the display carries the sequential frames.

A pert diagram of the process is:

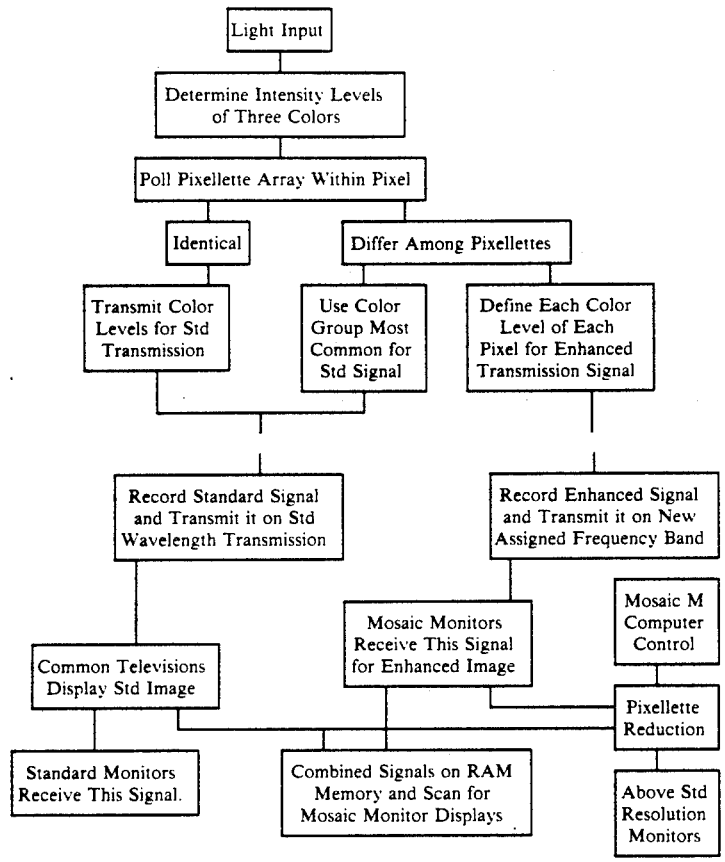

Using the prescribed 15 electron gun raster scanned electron stream to paint the image for each of the units in the total display, the 5×5 display will have 3500 fibers for the camera or tubules for the display across and 2625 down giving 9,197,500 resolution units per image with 27,562,500 data points considering the tricolor display. With the X-ray film equivalent resolution provided by the 8×8 unit display, 5600 across and 4200 down giving 23,420,000 resolution units per image with 70,560,000 data points with the tricolor display. How this 70 million number applies to monochrome X-rays is not clear, but perhaps some stereo effect is possible. Using a double rate scan gives a more continuous image. It also may apply to painting a graphic or text overlay. This uses a 24 electron gun scan.

Receiving and displaying a standard signal on a mosaic monitor for a single, full screen display, each unit would scan the 105 lines painting pixels, five tubules across and five tubules down giving 105 lines with 140 points across per unit. Over the full display of 5×5 units, each unit has 525 lines and 700 horizontal defined points giving a square pixel display of low flicker quality with the second scan painting allowed for graphics and text if desired.

Receiving and displaying several standard signals, one could display one signal per unit or 25 track video using one pixellette per pixel signal. One could also make the defined image bigger using the standard and enhanced inputs and cutting the display points as shown in FIG. 5. Here, if a 5×5 input is to be displayed in a 2×2 environment, the second and fourth pixellette are used to color the pixellettes throughout the display. Using a 3×3 display, the first, third, and fifth pixellettes are used to define the image. Using a 4×4, one leaves out the third pixellette rows and columns. Using an 8×8 display, one would double the first, third, and fifth pixellettes by row and column. The number of RAM Memory scan palettes must match the number of signals to be input to transfer to the main RAM memory scanner for the display painting for motion video inputs. To build a still frame image, the display can be built one segment at a time and retained on the main RAM thus only one extra RAM palette is needed. The PERT Diagram above has this pixellette reduction by computer control for mosaic monitors and also as a means of using the enhanced signal for displaying video on higher than standard resolution monitors.

Figure 6:
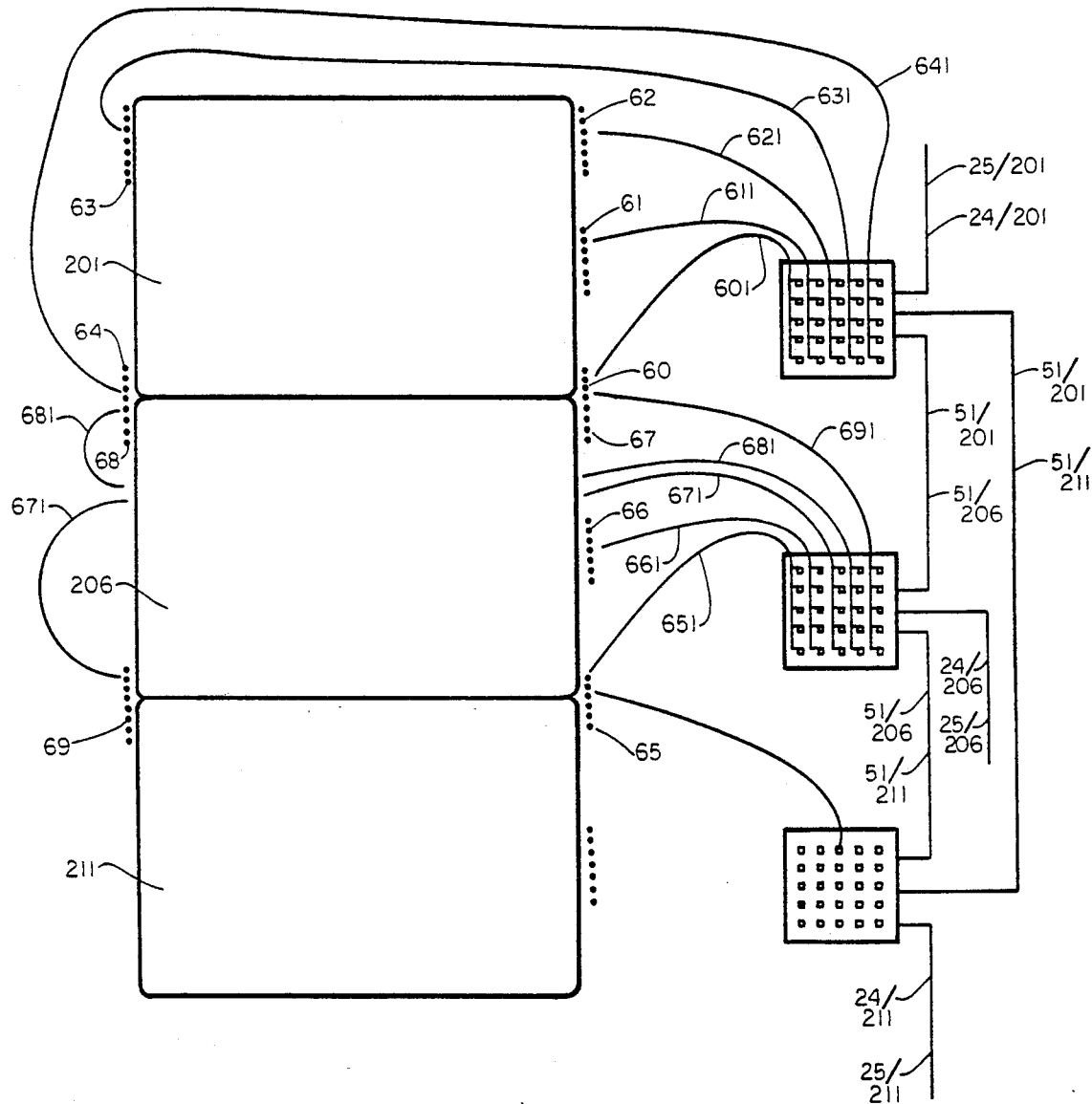
FIG. 6 is a diagram showing the alignment mechanism for total autoalignment and autotuning of the display units within the mosaic display.

FIG. 6 defines one means of calibrating the display units so as to guarantee proper image orientation, size and intensity. The four calibration points are derived from extending the top and bottom scans 62, 63, 60, and 64 and the midline scan 61 by extending each scan line one pixel where these extensions project a 30 percent white light intensity. This structure permits many adjustments. First, if any of the five points are not illuminated, the raster scan is adjusted by horizontal adjustment. When some of the fibers are illuminated, the raster scan 25 is adjusted vertically to fill the fields of five. Because there will be a standard white level which illuminates all the calibration points on all the units in the display, the color intensity levels of all the calibration pixels must match. Current levels of the electron guns 23 ar adjusted so that within one display unit all color intensity levels match and so that the intensity levels of the colors match among the display units in the mosaic monitor.

Placement of the processor for the fibers of the pixel unit is the same interface as for the camera components 42. The processor segment to do the adjustment is as described above. The units are placed within the full receiver circuitry between the universal raster scan control and the raster scanner for that display unit. It is also wired to the network of these processor segments for all other display units in the receiver to compare the color intensities. The corrections to uniformity of color is then made with the display unit processor segment wired to either the electron gun 23 input or to the RAM Memory Processor 5.

Figure 8A:
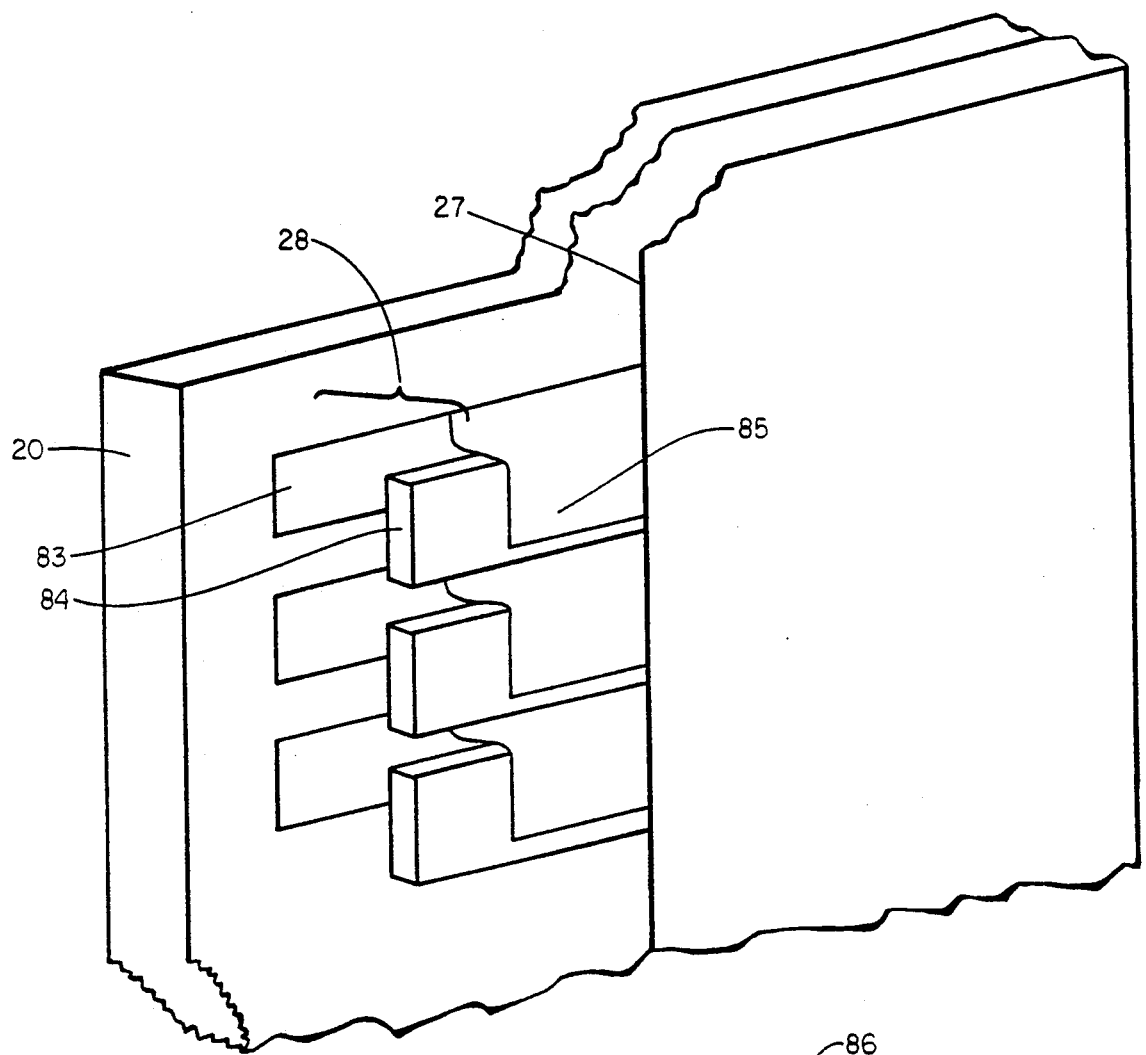
FIGS. 8A and 8B are sectional isometric views of the display area of the monitor illustrating the low-voltage conductive area.
Figure 8B:
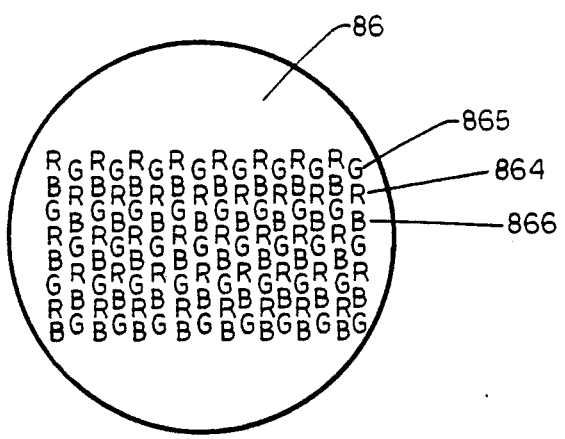
Figure 9B:
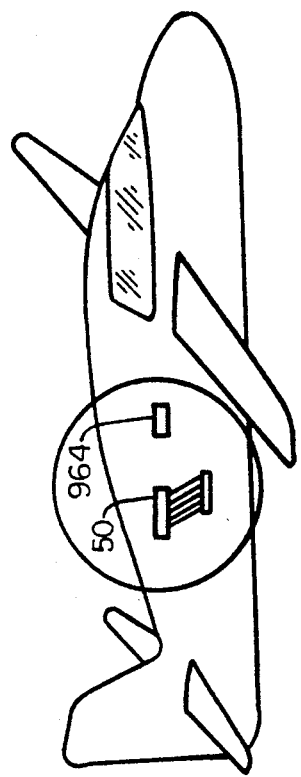
FIGS. 9A-9C are diagrams representing an application for a camera with multiple mosaic imaging and an associated display.
Figure 9C:
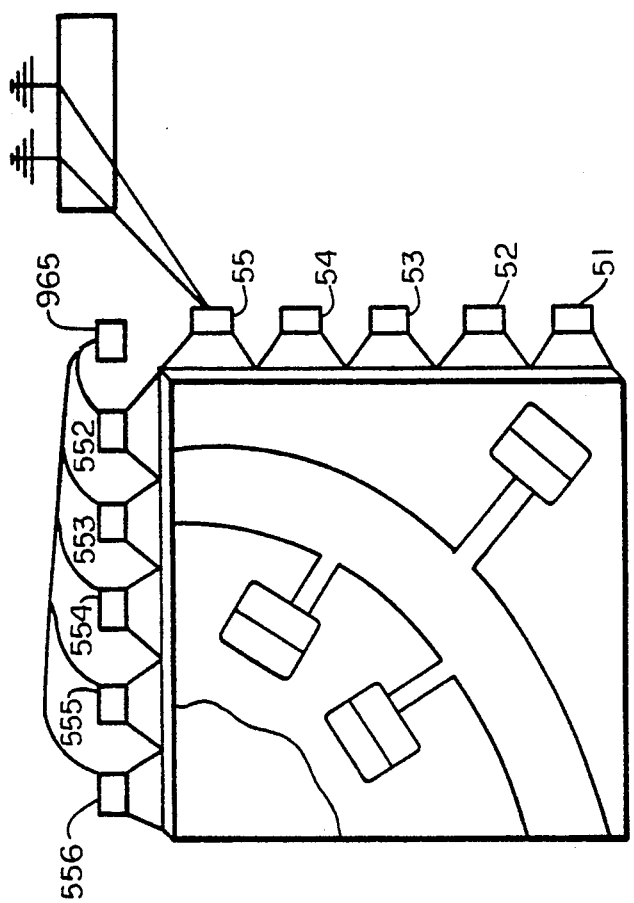
Figure 9A:
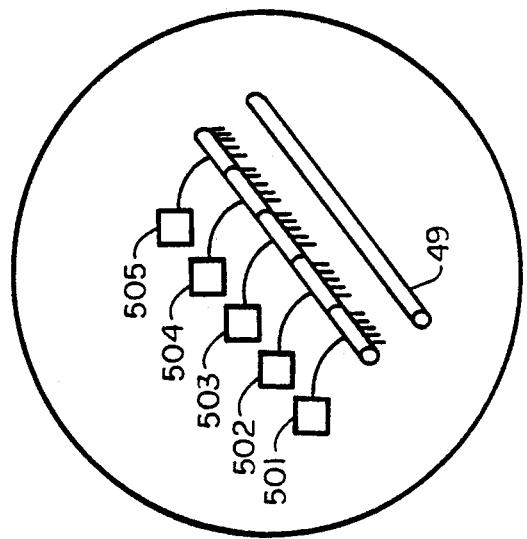

FIGS. 7 and 8 show mechanical and electronic features of the mosaic monitor which incorporates a plurality of display units in a single vacuum system. Coming off the RAM Memory 5 is the control signal for the electron gun bundle 80 controlling the intensities of each color emitter for each of the pixellette units or tubules 264 illuminated at 1/4,410,000 of a second. With a 5×5 display, each emitter 23 has 15 guns which, for example, can be arranged in two columns alternating the green versus red and blue from side to side for each of the five tubules.

The electron beam generated at emitter 23 passes through the final lens 24 which brings the image together both in the crosswise dimension 241 and in the lengthwise dimension 242 (see FIG. 4) so the raster scanner 25 passes the correct dimension image across the mask. The lens 24 is like two cylindrical lenses keeping the cross sectional shape of the electron beam, consisting of the individual beams from 15 electron guns, approximately rectangular. Passage rates can be near 60 times per second, double the standard video, repeating the image twice or with a new image each time or alternating an image with graphics and text.

The mask 26 is preferably formed of nonmagnetic material, e.g., molybdenum, which has tubules drilled by fine laser cutting in the substrate such that the tubule passes electrons only when the beam is on the appropriate pass and at the exact position. This nonmagnetic metal mask is then given a voltage level which is less than that on the inside of the viewing screen 27 to focus the electron beams (one each for red, green and blue) as they collide into the color specific phosphors making the color image. Of course, where the mask 26 is formed of a non-conductive material, no voltage is applied to the mask.

The raster scan angle $\beta$ can be as much as 110 degrees. The distance $a$ between the emitter and the display depends on the size of screen and the scan width and whether the gun location is in line or the beam is converted to the proper direction. Because the display enclosure is at high vacuum and the foreplate 20 and backplate are planar, inner structure 70 is provided to resist the negative pressure in the enclosure. It is made of a nonconductive ceramic which fits onto the molybdenum masking structure at unit junctures 727. This allows electrical insulation between the voltage-charged display area and mask and the high-current emitter bundles. Frit welding of the glass plate to the rear and the ceramic will enable vacuum sealing outside of the assembly environment which must be high vacuum (10 exp −6 mm of Hg).

FIG. 7 also illustrates the laser drilling of the mask holes so the pixellettes are pass specific and present a consistently even size of image across the screen. These drills pass the mask at the angle the raster scanner carries the electron beams cutting five holes vertically and 700 holes across with each of the 105 passes per display unit.

FIG. 8 shows a means of reducing the current usage for the mosaic display which also serves to increase the precision of electron excitation of the phosphors 86. As the electron gun beam consisting of electron beams of five tricolor emitters is directed to a set of five vertically arranged tubules, the voltage is increased for each of the five horizontal lines across the entire display. With this technique 1/105 of the voltage is required at any specific time. The physical conductive pattern is shown in the tri-striping of the conductive layer 83, 84, 85 of the inside of the surface faceplate 20 with conductive aluminum or other substrate for 3/5 of the five pixellette line for the standard display 83. Then an insulating layer 84 is striped across overlapping both neighboring conductive stripes. A second conductive layer 85 is evaporated to cover the omitted area plus contact the center stripe of its proper row. This skewed "y" structure allows full voltage provision for line specificity drawing the electrons to the proper location as the raster scan occurs for that row. The flex circuit pickup 871, 872 located at both ends of the display connect identical rows in each display unit tier so all displays are in synchronous scans.

To provide the appropriate electronic support for a mosaic monitor with, for example, 64 display units as used for medical diagnosis, the camera would have fibers in the image plate 40 sufficient to include all pixellettes in the display with triphotodiodes in pixel blocks which feed into three image processors 50, sharing 25 display units for the first and second and the remaining 14 for the third processor. Three standard broadcast output signals 46 and three enhanced signals 45 would go to the recording, broadcast or 64-unit mosaic monitor.

The procedures for making one rendition of this monitor include:

1. Treat the faceplate inside 27 with black substance and pierce it at the locations of each of the three color electron beams passing through each tubule in the mask if necessary.
2. Stripe transparent conductive coating 83 for each five pixellette row across the entire faceplate for each 105 passes for each display unit in the display. Then stripe an insulator 84 so as to bridge between the conductive stripes. Then set a second conductive layer 85 to complete the coverage for the five pixellette display which contacts the first conductive stripe so a to complete the circuit enabling voltage differences for the entire five pixellette width across the entire display.
3. Photoprocess or spatter with stencil the layering of the phosphors for emitting the three colors, red 864, blue 866, and green 865, at the proper locations within the tubule focus area for each tubule 264.
4. Secure molybdenum mask 26 against the glass to support its shape in the vacuum environment having thicker areas off center and the fence structure 726 at the interface between units and at edge locations which seat the ceramic superstructure 70.
5. Insert the five fiberglass fibers in each calibration location 62, 63 putting the five bundles into a single pixel processor which then define the tricolor levels for each pixellette, as in the camera, and the corrective mechanism for adjusting the raster scan 25/201 to align the unit and the mechanism for adjusting the current level to the emitters 23 to tune the intensity of colors in this unit with the rest of the units in the display. There is a connecting circuit between these pixel outputs that balances the intensities for the white light exposure to these calibration points. Conventional circuitry 97 is installed to work in concert with the raster scanner 25 giving precision to the image displays of the monitor units.

6. Prepare the ceramic superstructure 70 by securing in place the emitters 23, the final lens 24, the raster scanner 25 and external connectors 80.
7. Prepare the backplate 75 with connectors 801, 806 and holes as required and the frit deposits.
8. Assemble the unit, edge and seal the unit in the high-vacuum environment including the faceplate voltage feed units.

This concludes the detail on the visual imaging. The apparatus in FIG. 1 serves the audio and voice signal.

An alternative configuration of the audio unit is presented in FIG. 1. This figure shows the functions of the unit in FIG. 1A, and two views of one configuration of the development in FIGS. 1B and 1C.

Discussing the functions of the unit as illustrated in FIG. 1A, the upper group shows audio signal input for general audio and coded voice. Lower the grouping represents sound output leaving the unit as audio signal or coded voice.

The range of receiving functions include in coded voice reception manually coded input 14, phone or microphone voice input 15 an 16 coded and recorded code 91. In presentation it is provided through a tactile receiver 18 going directly to the tactile array 185 or through the voice synthesizer 183 to normal audio means as earphones 17, telephone 16 and/or speaker 19. The standard audio signal is received from recorded sound 91, transmission as per modem 92, microphone 15 or telephone 16. It is presented by the tactile armband 18 entering at the analyzer input 183 where it is processed into codes that drive th tactile stimulators or by the earphones 17, telephone 16 and/or speaker 19, or recorded by any means 91, 96.

Output from the system originates from the telephone 16, microphone 15 or recorded sources 91, 96 or direct from reception, i.e., were the audio of a received television broadcast shared simultaneously with reception. This output is transmitted in standard audio or coded voice using the sound analyzer 182 which outputs coded voice sounds and pitch. The presentation direct or through a modem 92 is by the same array of means as described as used in reception above.

One design of an audio unit is shown in two aspects in FIG. 1B and C. The unit is designed secured by a stem held securely in a turning device 10 as a bearing or bushing to allow choice of input and directional focus of the sound. Th inputs to the unit are from the computer video monitor 90, 91 and/or the telephone line at jack 164. The volume or intensity is adjusted down from the input level by knob 191 adjusting the volume control. Facing the participant in FIG. 1B is a speaker 19 and microphone 15 allowing use of the audio unit as a speaker telephone. Turning the unit in the bearing 10, the face in FIG. 1C is forward. Externally showing are the telephone connector 165 for head and handset and jacks for earphones 171 microphone 151 and/or the tactile armband 181. Within the unit is shown the speaker 19, voice synthesizer 184, and voice coding unit 182.

This unit mounted to the left or right, or if stereo sound is desired on both sides, on the undersurface of the table or desktop provides full telephone and audio with no obstruction of the work surface. If the telephone dialing is not accommodated in the computer system, it can stand alone as a telephone unit if a dial is provided as, for example, in a drawer-type or rotating manner stored under the work surface adjacent to the audio unit. The sound directed at the participant allows a lower sound volume to be used because it is aimed directly at the listener and not deflected sound as occurs so frequently with present day television.

One of many alternative configurations to the audio unit is shown in FIGS. 1D, E and F. Here is a simple speaker 19 and microphone 15 are mounted in a megaphone-type mounting setting into the kiosk surface 11 aside the terminal unit. The cone is aimed at the viewer's ear position. Using sound insulation in the walls of the megaphone construction prevents further broad reflection of sound.

This limits sound proliferation in the environment. The microphone placed inside the cone picks up the voice enabling a person to answer in the direction from which the voice came. One can, were this used in a building directory, for example, announce their coming and find the room number, determine if the person to be visited is in, or find where to make a delivery before taking the elevator. This can serve as a security device allowing the person contacted from the building directory to admit only those authorized. It enables after hours visitors to make contact with the persons they have come to visit.

Reviewing the prior filing (DuBrucq, 1987) in this accumulating filing in light of the additions herein, we find that the increased resolution of the mosaic monitor signal can expand the per frame recorded voice code data (U.S. Pat. No. 4,520,501) when defining the field on the enhanced frequency band. With all the waits and stops in speech, much of the field can still be serviced by the standard band signal, however, the compiling of sound and pitch can be carried in a more condensed fashion. Digitizing the intensity gradients of each color, say in nine levels, using three monochromes, the exact pitch can be conveyed in the auditory spectrum by multiplying intensity levels on the three inputs. Three more monochromes can define the sound and duration provided in real time scan. The scan time using each display unit, one at a time in sequence, give for a 5×5 mosaic monitor signal, 25 times the data space than what was discussed in the original writing.

The image system expanded from the early fiber optic camera has enhanced the signal and split the transmission keeping the current standard and adding the enhanced signal for those with mosaic monitor equipment. In the case that a bending of the electron beam is chosen, the electron radiation can be shielded from the environment using the radiation shield laminate 79 with two materials, lead 792 bounded by tantalum 791, over the nonviewing sides including the back cover. The multiple display units can be cooled by conduction and the thermodetectors described in patents U.S. Pat. No. 4,502,487 and U.S. Pat. No. 4,633,885 and applied to fan control can cool the system as needed beyond normal convection air movement.

This Interactive System can be expanded to image control by both voice command and touch command making the size of an image, still or motion, and auxiliary displayed information as well as audio selections to be created and controlled by finger touch.

The Processor/Recorder System requires a three-track output, the audio tracks, the standard video signal and the enhanced mosaic monitor signal. The recording patterns need be modified so it is expedient to create the recording system to lay the signal on flexible discs. With this, the autocharger designed in the major filing can apply as the 'film canister' housing recording material for many hours of shooting. Editing off these discs to fresh discs is easier than the tape media since all frames are available on the surface plane recording medium of the disc. Therefore, the choice of frames for stills or starting and ending points for motion are easily selected and played for recording.

Reference is made to the fiberoptic camera in tissue probes in DeBrucq, et. al. U.S. Pat. No. 4,502,487 for an application of the present invention. Substitution of the pixel triphotodiode 42 for the film pack in the DeBrucq fiberoptic camera allows up to 25 fibers per triphotodiode unit for tracking tissue coloration as the probe is inserted and withdrawn from the tissue. Displaying these scans, the sequenced colors can be presented in brands having proportions and proximities determined graphically. Instant viewing of combined scans on a single screen can aid in diagnosis.

It will be understood that reasonable variation and modifications can be made without departing from the scope of the invention as defined in the accompanying claims.

I claim:

1. An apparatus for displaying a video image comprising:
    an enclosure having an image screen and a coplanar faceplate;
    a plurality of monitor units disposed within said enclosure and immediately adjacent each other in a planar array, said array being disposed adjacent the image screen;
    means for applying a voltage across a portion of the surface of the faceplate comprising a first layer of strips of conductive material on the surface of the faceplate, a second layer of strips of conductive material overlaying the first layer and offset therefrom, each strip of the first and second layers being insulated from an adjacent strip, and each strip of the second layer being conductively connected to and adjacent strip of the first layer.

2. A display device comprising:
    an enclosure having a frontal wall forming a display screen and a back wall;
    a plurality of devices in said enclosure for illuminating said screen, said devices arranged in an array and each for illuminating a portion of said screen;
    a substantially rigid substrate disposed within said enclosure and substantially filling said enclosure;
    said substrate having a plurality of cavities, and one of said devices disposed in each of said cavities;
    each of said cavities having an end wall adjacent said frontal wall provided with a plurality of openings to permit illumination of said display screen by said devices;
    whereby said substrate provides internal support for said frontal wall and said back wall.

3. The arrangement in accordance with claim 2 wherein said devices generate electron beams for projection onto said frontal wall and said end walls of each of said cavities comprise a plurality of substantially tubularly-shaped openings for allowing passage of said electron beams from said devices to said frontal wall.

4. The arrangement in accordance with claim 3 wherein said frontal wall has a substantially flat inner surface and said devices project electron beams onto said inner surface at predetermined angles and said tubularly-shaped openings extend through said end wall at angles corresponding to said predetermined angles.

5. The arrangement in accordance with claim 4 wherein at least two of said cavities are disposed adjacent one another and certain of said tubularly-shaped openings of said adjacent cavities extend at angles toward one another and have end openings adjacent one another and adjacent said inner surface of said frontal wall.

6. The arrangement in accordance with claim 2 wherein said substrate comprises nonmagnetic material.

7. The arrangement in accordance with claim 2 wherein at least two of said devices each comprise an electron gun and said frontal wall has an inner surface and a phosphorous coating on said inner surface and wherein certain electron beams of electron guns in adjacent openings are projected onto adjacent areas of said phosphorous surface;
    whereby electron guns in adjacent cavities produce a substantially seamless illumination of an area of said surface.

* * * * *